United States Patent
Akai et al.

(10) Patent No.: US 12,006,406 B2
(45) Date of Patent: Jun. 11, 2024

(54) METHOD FOR PRODUCING ACRYLIC BLOCK COPOLYMER PELLETS

(71) Applicant: KURARAY CO., LTD., Kurashiki (JP)

(72) Inventors: Makoto Akai, Tsukuba (JP); Tomohiro Ono, Tsukuba (JP); Moe Kawahara, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 687 days.

(21) Appl. No.: 16/973,924

(22) PCT Filed: May 28, 2019

(86) PCT No.: PCT/JP2019/021099
§ 371 (c)(1),
(2) Date: Dec. 10, 2020

(87) PCT Pub. No.: WO2019/239878
PCT Pub. Date: Dec. 19, 2019

(65) Prior Publication Data
US 2021/0115197 A1    Apr. 22, 2021

(30) Foreign Application Priority Data

Jun. 12, 2018  (JP) ................................. 2018-111888

(51) Int. Cl.
*C08F 220/14* (2006.01)
*C08F 220/18* (2006.01)
*C08F 293/00* (2006.01)
*C08J 3/12* (2006.01)

(52) U.S. Cl.
CPC ............... *C08J 3/12* (2013.01); *C08F 220/14* (2013.01); *C08F 293/00* (2013.01); *C08F 220/18* (2013.01); *C08J 2355/00* (2013.01)

(58) Field of Classification Search
CPC . C08J 3/12; C08J 3/124; C08J 2333/08; C08J 2333/10; C08J 2333/12; C08F 220/1804; C08F 220/14
See application file for complete search history.

(56) References Cited

U.S. PATENT DOCUMENTS

| 5,264,527 | A | 11/1993 | Varshney et al. |
| 5,294,674 | A | 3/1994 | Varshney et al. |
| 5,591,816 | A | 1/1997 | Varshney et al. |
| 5,668,231 | A | 9/1997 | Varshney et al. |

FOREIGN PATENT DOCUMENTS

| EP | 3 848 198 A1 | 7/2021 | |
| JP | 6-93060 A | 4/1994 | |
| JP | 7-25859 B2 | 3/1995 | |
| JP | 11-335432 A | 12/1999 | |
| JP | 2003-253005 A | * 9/2003 | ............... C08J 3/12 |
| JP | 2003-266430 A | 9/2003 | |
| JP | 2016-104830 A | * 6/2016 | .............. C08L 53/00 |
| JP | 2016-188327 A | 11/2016 | |

OTHER PUBLICATIONS

JP 2003-253005 A (Sep. 10, 2003); machine translation. (Year: 2003).*
JP 2016-104830 A (Jun. 9, 2016); machine translation. (Year: 2016).*
Extended European Search Report dated Feb. 18, 2022 in European Patent Application No. 19818794.0, 14 pages.
"MX-1000Y_Suzhou Soken Chemical Co., Ltd," Retrieved from the Internet [URL: http://en.soken-sz.com/product/33.html], XP055887735, Jan. 2021, pp. 1-3.
International Search Report and Written Opinion dated Aug. 27, 2019 in PCT/JP2019/021099 filed on May 28, 2019, 5 pages.
Japanese Office Action dated Jan. 21, 2020 in Japanese Application No. 2019-561202, 3 pages.
Moineau, G. et al., "Synthesis of fully acrylic thermoplastic elastomers by atom transfer radical polymerization (ATRP), 2 $^a$. Effect of the catalyst on the molecular control and the rheological properties of the triblock copolymers", Macromolecular Chemistry and Physics, 2000, vol. 201, No. 11, pp. 1108-1114, 7 total pages.

* cited by examiner

*Primary Examiner* — Rip A Lee
(74) *Attorney, Agent, or Firm* — Oblon, McClelland, Maier & Neustadt, L.L.P.

(57) ABSTRACT

Pellets of an acrylic block copolymer are provided which are imparted with sufficient antiblocking properties without deterioration in the outstanding performance of the acrylic block copolymer such as transparency. A method for producing pellets (D) including an acrylic block copolymer (A) includes bringing raw pellets of an acrylic block copolymer (A) into contact with an aqueous dispersion (C) containing acrylic resin particles (B) and no surfactants, the acrylic block copolymer (A) including at least one polymer block (a1) including acrylic acid alkyl ester units and at least one polymer block (a2) including methacrylic acid alkyl ester units, and removing water attached to the pellets.

6 Claims, No Drawings

METHOD FOR PRODUCING ACRYLIC BLOCK COPOLYMER PELLETS

TECHNICAL FIELD

The present invention relates to a method for producing antistick-treated acrylic block copolymer pellets.

BACKGROUND ART

Acrylic block copolymers that include a polymer block composed of acrylic acid ester units and a polymer block composed of methacrylic acid ester units have characteristics which make them attractive for use in various applications such as adhesives, soft materials and resin modifiers. For example, these acrylic block copolymers are used in various shaping methods such as injection molding and extrusion, and are therefore usually produced in the form of granular pellets. Unfortunately, the acrylic block copolymers usually contain soft components and easily become blocked.

A possible approach to preventing this blocking is to apply an antiblocking agent such as ethylenebisstearamide to the surface of the pellets. However, the use of ethylenebisstearamide as an antiblocking agent results in problems such as a decrease in the transparency of shaped articles that are obtained, and the occurrence of die buildup.

An approach proposed to solve this problem is to add a lubricant to an acrylic block copolymer (see, for example, Patent Literature 1).

CITATION LIST

Patent Literature

Patent Literature 1: JP-A-2003-253005

SUMMARY OF INVENTION

Technical Problem

It has been found that the antiblocking approach described in the above patent literature is sometimes incapable of sufficiently preventing the occurrence of blocking. An object of the present invention is to provide pellets of an acrylic block copolymer which are imparted with sufficient antiblocking properties without deterioration in the outstanding performance of the acrylic block copolymer such as transparency and which are less prone to generate froths to realize excellent production efficiency.

Solution to Problem

The present inventors carried out extensive studies directed to achieving the above object, and have consequently found that pellets of an acrylic block copolymer obtained through a step of contact with a specific aqueous dispersion containing acrylic resin particles attain sufficient antiblocking properties without deterioration in the outstanding performance of the acrylic block copolymer such as transparency and are also less prone to generate froths to realize excellent production efficiency.

According to the present invention, the above object is achieved by providing:

[1] A method for producing pellets (D) including an acrylic block copolymer (A), the method including a step of bringing raw pellets of an acrylic block copolymer (A) into contact with an aqueous dispersion (C) containing acrylic resin particles (B) and no surfactants, the acrylic block copolymer (A) including at least one polymer block (a1) including acrylic acid alkyl ester units and at least one polymer block (a2) including methacrylic acid alkyl ester units, and a step of removing water attached to the pellets;

[2] The method described in [1] for producing pellets (D) including an acrylic block copolymer (A), wherein the aqueous dispersion (C) includes at least one selected from the group consisting of an aqueous dispersion (C-1) containing wet-ground acrylic resin particles (B), and an aqueous dispersion (C-2) containing dry-ground acrylic resin particles (B);

[3] The method described in [2] for producing pellets (D) including an acrylic block copolymer (A), wherein the aqueous dispersion (C) includes an aqueous dispersion (C-1) containing wet-ground acrylic resin particles (B);

[4] The method described in any of [1] to [3] for producing pellets (D) including an acrylic block copolymer (A), wherein the acrylic resin particles (B) contained in the aqueous dispersion (C) include not less than 85 mass % of methyl methacrylate units;

[5] The method described in any of [1] to [4] for producing pellets (D) including an acrylic block copolymer (A), wherein the acrylic resin particles (B) contained in the aqueous dispersion (C) have a D50 value in a particle size distribution of 1 to 50 µm;

[6] The method described in any of [1] to [5] for producing pellets (D) including an acrylic block copolymer (A), wherein the solid concentration of the acrylic resin particles (B) contained in the aqueous dispersion (C) is 0.05 to 2.0 mass %;

[7] The method described in any of [1] to [6] for producing pellets (D) including an acrylic block copolymer (A), wherein in the step of contact, the raw pellets of the acrylic block copolymer (A) are brought into contact with the aqueous dispersion (C) having a temperature of 10 to 80° C.;

[8] The method described in any of [1] to [7] for producing pellets (D) including an acrylic block copolymer (A), wherein the acrylic block copolymer (A) has, in the molecule thereof, at least one structure in which a polymer block (a2) including methacrylic acid alkyl ester units is bonded to each of both ends of a polymer block (a1) including acrylic acid alkyl ester units, and the acrylic block copolymer (A) has a weight average molecular weight of 30,000 to 250,000 and a content of the polymer blocks (a2) of 5 to 40 mass %; and

[9] A pellet (D) including an acrylic block copolymer (A), produced by the production method described in any of [1] to [8].

Advantageous Effects of Invention

According to the present invention, pellets of an acrylic block copolymer may be obtained which are imparted with sufficient antiblocking properties without deterioration in the outstanding performance of the acrylic block copolymer such as transparency and which are less prone to generate froths to realize excellent production efficiency.

DESCRIPTION OF EMBODIMENTS

The present invention will be described in detail hereinbelow. In the present specification, "(meth)acrylic acid ester" is a general term for "methacrylic acid ester" and "acrylic acid ester", and "(meth)acrylic" is a general term for "methacrylic" and "acrylic".

(Acrylic Block Copolymers (A))

An acrylic block copolymer (A) that is included in raw pellets used in the present invention has at least one polymer block (a1) including acrylic acid alkyl ester units, and at least one polymer block (a2) including methacrylic acid alkyl ester units.

Examples of the acrylic acid alkyl esters which form structural units of the polymer blocks (a1) include methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate and stearyl acrylate.

When the alkyl group in the acrylic acid alkyl ester is a short-chain alkyl group having 4 or less carbon atoms in the main chain thereof (such as, for example, methyl acrylate, ethyl acrylate, propyl acrylate, n-butyl acrylate or t-butyl acrylate), the acrylic block copolymer (A) tends to show enhanced fluidity and tensile strength. When the alkyl group contained in the acrylic acid alkyl ester is a long-chain alkyl group having 6 or more carbon atoms in the main chain thereof (such as, for example, n-hexyl acrylate, cyclohexyl acrylate, 2-ethylhexyl acrylate, n-octyl acrylate, lauryl acrylate, tridecyl acrylate or stearyl acrylate), the acrylic block copolymer (A) tends to show enhanced low-temperature characteristics.

The acrylic acid alkyl ester units which are structural units of the polymer block (a1) may be composed of a single acrylic acid alkyl ester or may be composed of two or more kinds of acrylic acid alkyl esters. The proportion of the acrylic acid alkyl ester units contained in the polymer block (a1) is preferably not less than 60 mass %, more preferably not less than 80 mass %, and still more preferably not less than 90 mass % of the polymer block (a1). The acrylic acid alkyl ester units may represent 100 mass % of the polymer block (a1).

The polymer block (a1) may include other monomer units without impairing the advantageous effects of the present invention. Examples of the monomers for forming such additional units include methacrylic acid alkyl esters described later, methacrylic acid esters having no functional groups except methacrylic acid alkyl esters, methacrylic acid esters having a functional group, acrylic acid esters having no functional groups except acrylic acid alkyl esters, acrylic acid esters having a functional group, vinyl monomers having a carboxyl group, vinyl monomers having a functional group, aromatic vinyl monomers, conjugated diene monomers, olefin monomers, and lactone monomers. When these monomers are used, the amount thereof is usually small and is preferably not more than 40 mass %, more preferably not more than 20 mass %, and still more preferably not more than 10 mass % of the total mass of the monomers used for the formation of the polymer block (a1).

The glass transition temperature of the polymer block (a1) is preferably −100 to 40° C., more preferably −80 to 35° C., and still more preferably −70 to 30° C. When the glass transition temperature of the polymer block (a1) is in the above range, the pellets including the acrylic block copolymer (A) that are obtained attain excellent flexibility and adhesive characteristics even at low temperatures. To ensure that the polymer block (a1) is obtained easily and will have a glass transition temperature in the above range, methyl acrylate, propyl acrylate, n-butyl acrylate, 2-ethylhexyl acrylate and n-octyl acrylate are preferable among the acrylic acid alkyl esters described hereinabove.

The acrylic block copolymer (A) may include two or more polymer blocks (a1). In such a case, the polymer blocks (a1) may be the same as or different from one another.

Examples of the methacrylic acid alkyl esters which form structural units of the polymer blocks (a2) include methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate and isobornyl methacrylate. Of these, methyl methacrylate, ethyl methacrylate and propyl methacrylate are preferable. Methyl methacrylate is more preferable for reasons such as because it is economically easily available and because the polymer block (a2) that is obtained has excellent durability and weather resistance.

The methacrylic acid alkyl ester units which are structural units of the polymer block (a2) may be composed of a single methacrylic acid alkyl ester or may be composed of two or more kinds of methacrylic acid alkyl esters. The proportion of the methacrylic acid alkyl ester units contained in the polymer block (a2) is preferably not less than 60 mass %, more preferably not less than 80 mass %, and still more preferably not less than 90 mass % of the polymer block (a2). The methacrylic acid alkyl ester units may represent 100 mass % of the polymer block (a2).

The polymer block (a2) may include other monomer units without impairing the advantageous effects of the present invention. Examples of such additional monomers include methacrylic acid esters having no functional groups except methacrylic acid alkyl esters, such as phenyl methacrylate and benzyl methacrylate; methacrylic acid esters having a functional group, such as methacrylic acid alkoxyalkyl esters including methoxyethyl methacrylate and ethoxyethyl methacrylate, diethylaminoethyl methacrylate, 2-hydroxyethyl methacrylate, 2-aminoethyl methacrylate, glycidyl methacrylate and tetrahydrofurfuryl methacrylate; the acrylic acid alkyl esters described hereinabove; acrylic acid esters having no functional groups except acrylic acid alkyl esters, such as phenyl acrylate and benzyl acrylate; acrylic acid esters having a functional group such as acrylic acid alkoxyalkyl esters including methoxyethyl acrylate and ethoxyethyl acrylate, diethylaminoethyl acrylate, 2-hydroxyethyl acrylate, 2-aminoethyl acrylate, glycidyl acrylate and tetrahydrofurfuryl acrylate; vinyl monomers having a carboxyl group such as (meth)acrylic acid, crotonic acid, maleic acid, maleic anhydride, fumaric acid and (meth)acrylamide; vinyl monomers having a functional group such as (meth)acrylonitrile, vinyl acetate, vinyl chloride and vinylidene chloride; aromatic vinyl monomers such as styrene, α-methylstyrene, p-methylstyrene and m-methylstyrene; conjugated diene monomers such as butadiene and isoprene; olefin monomers such as ethylene, propylene, isobutene and octene; and lactone monomers such as ε-caprolactone and valerolactone. When these monomers are used, the amount thereof is usually small and is preferably not more than 40 mass %, more preferably not more than 20 mass %, and still more preferably not more than 10 mass % of the total mass of the monomers used for the formation of the polymer block (a2).

The glass transition temperature of the polymer block (a2) is preferably 50 to 150° C., more preferably 70 to 140° C., and still more preferably 80 to 130° C. When the glass transition temperature of the polymer block (a2) is in the above range, the polymer is easy to pelletize and tends to show low blocking tendency when stored as pellets at high temperatures (for example, 50° C.)

The acrylic block copolymer (A) may include two or more polymer blocks (a2). In such a case, the polymer blocks (a2) may be the same as or different from one another.

The weight average molecular weight of the polymer block (a2) is not particularly limited, but is preferably in the range of 1,000 to 50,000, and more preferably in the range of 4,000 to 20,000. If the weight average molecular weight of the polymer block (a2) is less than 1,000, the acrylic block copolymer (A) that is obtained may have an insufficient cohesive force. If the weight average molecular weight of the polymer block (a2) is higher than 50,000, the melt viscosity of the obtainable acrylic block copolymer (A) is so increased that the productivity of the acrylic block copolymer (A), and properties such as shaping properties of pellets including the acrylic block copolymer (A) may be deteriorated. In the present specification, the weight average molecular weight (Mw) means the weight average molecular weight measured by a gel permeation chromatography (GPC) method relative to standard polystyrenes.

In the acrylic block copolymer (A), the difference in glass transition temperature between the polymer block (a2) and the polymer block (a1) is preferably not less than 70° C., and more preferably not less than 100° C.

The acrylic block copolymer (A) may have the polymer block (a1) and the polymer block (a2) as the only polymer blocks, or may have a polymer block other than the polymer block (a1) and the polymer block (a2). When the acrylic block copolymer (A) has a plurality of polymer blocks (a1) or polymer blocks (a2), the compositions, molecular weights and stereoregularities of the polymer blocks may be the same as or different from one another. In a preferred embodiment, the acrylic block copolymer has, in the molecule thereof, at least one structure in which the polymer block (a2) is bonded to each of both ends of the polymer block (a1).

The acrylic block copolymer (A) is preferably represented by any of the general formulae below where "a2" is the polymer block (a2) and "a1" is the polymer block (a1):

(a2-a1)n

(a2-a1)n-a2 a1-(a2-a1)n

(a2-a1)n-Z

(a1-a2)n-Z

In the formulae, n is an integer of 1 to 30, and Z is a coupling site (a coupling site resulting from the formation of a chemical bond by the reaction of the polymer end with a coupling agent). The value of n is preferably 1 to 15, more preferably 1 to 8, and still more preferably 1 to 4.

Of the structures described above, those in which the polymer block (a2) is bonded to each of both ends of the polymer block (a1) are preferable.

Specifically, those represented by the following general formulae are preferable:

(a2-a1)$n_1$

(a2-a1)n-a2 a1-(a2-a1)$n_1$

(a2-a1)$n_1$-Z

(a1-a2)$n_1$-Z

In the formulae, n is an integer of 1 to 30, $n_1$ is an integer of 2 to 30, and Z is a coupling site (a coupling site resulting from the formation of a chemical bond by the reaction of the polymer end with a coupling agent). The value of $n_1$ is preferably 2 to 15, more preferably 2 to 8, and still more preferably 2 to 4.

Of the above structures, linear block copolymers represented by (a2-a1)n, (a2-a1)n-a2, and a1-(a2-a1)n are more preferable, and the diblock copolymer represented by a2-a1, and the triblock copolymer represented by a2-a1-a2 are still more preferable.

The content of the polymer block (a2) in the acrylic block copolymer (A) is preferably 5 to 40 mass %.

If the content of the polymer block (a2) is less than 5 mass %, the acrylic block copolymer (A) may be too much fluid and may be liquid or be incapable of keeping the pellet shape when the acrylic block copolymer (A) is pelletized by, for example, cutting with an underwater cutter or the like. If the content of the polymer block (a2) exceeds 40 mass %, the pellets including the acrylic block copolymer (A) that are obtained tend to fail to attain excellent flexibility.

To obtain pellets with excellent flexibility, the content of the polymer block (a2) in the acrylic block copolymer (A) is preferably 8 to 35 mass %, and more preferably 15 to 31 mass %.

From the points of view of the compatibility with acrylic resin particles (B) contained in an aqueous dispersion (C) described later and the processability of pellets including the acrylic block copolymer (A) that are obtained, the weight average molecular weight of the acrylic block copolymer (A) is preferably 30,000 to 250,000, more preferably 40,000 to 200,000, still more preferably 50,000 to 180,000, and further preferably 60,000 to 160,000. If the weight average molecular weight of the acrylic block copolymer (A) is less than 30,000, the cohesive force of the acrylic block copolymer (A) may be insufficient, and shaped articles or adhesive products that are obtained may be inferior in durability. Other problems may arise such as the acrylic block copolymer (A) bleeding on the surface of shaped articles or adhesive products. If, on the other hand, the weight average molecular weight of the acrylic block copolymer (A) exceeds 250,000, the melt viscosity is so increased that the productivity and processability may be deteriorated. Other problems may arise such as low compatibility with acrylic resin particles (B) described later, insufficient transparency of shaped articles or adhesive products that are obtained, and variations in properties of shaped articles or adhesive products that are obtained.

In the acrylic block copolymer (A), the molecular weight distribution (Mw/Mn) is preferably 1.0 to 1.5. When the molecular weight distribution of the acrylic block copolymer (A) is in the above range, the polymer will not contaminate a mold during the molding process, and will exhibit a high cohesive force while not contaminating the adherend when used as an adhesive. From these points of view, the molecular weight distribution is more preferably 1.0 to 1.4, and still more preferably 1.0 to 1.3. In the present specification, the number average molecular weight (Mn) and the weight average molecular weight (Mw) mean the number average molecular weight and the weight average molecular weight measured by a gel permeation chromatography (GPC) method relative to standard polystyrenes.

The acrylic block copolymer (A) may be produced by any production method in accordance with a known process without limitation. In general, a block copolymer having a narrow molecular weight distribution is obtained by the living polymerization of monomers as structural units.

Examples of such living polymerization processes include living polymerization using an organic rare earth metal complex as a polymerization initiator (see, for example, JP-A-H11-335432), living anionic polymerization using an organoalkali metal compound as a polymerization initiator in the presence of a mineral acid salt such as an alkali metal or alkaline earth metal salt (see, for example, JP-B-H07-25859), living anionic polymerization using an organoalkali metal compound as a polymerization initiator in the presence of an organoaluminum compound (see, for example, JP-A-H06-93060), and atom transfer radical polymerization (ATRP) (see, for example, Macromol. Chem. Phys., 2000, 201, pp. 1108-1114).

Of the above production processes, living anionic polymerization in the presence of an organoaluminum compound is advantageous in that the decrease in activity during the polymerization is small and thus the block copolymer obtained contains little homopolymers and has high transparency. Further, the block copolymer contains little residual monomers by virtue of the high rate of monomer to polymer conversion, and the acrylic block copolymer (A) can be pelletized with suppressed generation of froths. Furthermore, the polymer block including methacrylic acid alkyl ester units has a highly syndiotactic molecular structure to effectively enhance the durability of pellets including the acrylic block copolymer (A) that are obtained. Further, the living anionic polymerization is feasible under relatively mild temperature conditions and thus the environmental load in industrial production (mainly the electricity for refrigerators to control the polymerization temperature) is advantageously small. For these reasons, the acrylic block copolymer (A) is preferably produced by living anionic polymerization using an organoalkali metal compound as a polymerization initiator in the presence of an organoaluminum compound.

In an example method of living anionic polymerization in the presence of an organoaluminum compound, (meth) acrylic acid esters may be polymerized in the presence of an organolithium compound and an organoaluminum compound represented by the following general formula (1):

$$AlR^1R^2R^3 \quad (1)$$

wherein $R^1$, $R^2$ and $R^3$ are each independently an optionally substituted alkyl group, an optionally substituted cycloalkyl group, an optionally substituted aryl group, an optionally substituted aralkyl group, an optionally substituted alkoxyl group, an optionally substituted aryloxy group or an N,N-disubstituted amino group, or wherein $R^1$ represents any of the above groups and $R^2$ and $R^3$ together form an optionally substituted arylenedioxy group. Where necessary, the polymerization further involves an ether compound such as dimethyl ether, dimethoxyethane, diethoxyethane or 12-crown-4; and/or a nitrogen-containing compound such as triethylamine, N,N,N',N'-tetramethylethylenediamine, N,N, N',N'',N''-pentamethyldiethylenetriamine, 1,1,4,7,10,10-hexamethyltriethylenetetramine, pyridine or 2,2'-dipyridyl, in the reaction system.

Examples of the organolithium compounds include alkyllithiums and alkyldilithiums such as n-butyllithium, sec-butyllithium and tetramethylenedilithium; aryllithiums and aryldilithiums such as phenyllithium and xylyllithium; aralkyllithiums and aralkyldilithiums such as benzyllithium and dilithium formed by the reaction of diisopropenylbenzene and butyllithium; lithium amides such as lithium diisopropylamide; and lithium alkoxides such as methoxylithium.

From points of view such as high living properties during polymerization and easy handling, some preferred organoaluminum compounds represented by the general formula (1) are isobutylbis(2,6-di-tert-butyl-4-methylphenoxy)aluminum, isobutylbis(2,6-di-tert-butylphenoxy)aluminum and isobutyl[2,2'-methylenebis(4-methyl-6-tert-butylphenoxy)] aluminum.

The acrylic block copolymer (A) is used as raw pellets. The raw pellets including the acrylic block copolymer (A) may be produced by, for example, melt extruding the acrylic block copolymer (A) into strands and cutting the strands with an underwater cutter, a center hot cutter, a strand cutter or the like into pellets. The form of the raw pellets is not particularly limited as long as the pellets can be brought into contact with an aqueous dispersion (C) described later which contains acrylic resin particles (B) and no surfactants. The raw pellets usually have a substantially cylindrical or substantially spherical (elliptical) form. The maximum diameter of the raw pellets of the acrylic block copolymer (A) is preferably 2 to 8 mm, and more preferably 2 to 6 mm. The maximum diameter of the raw pellets may be determined depending on the shape by measuring the maximum column height in the case of substantially cylindrical shape or the longest side across an ellipsoid in the case of substantially spherical shape, with use of a commercially available length-measuring gauge.

The content of the acrylic block copolymer (A) included in the raw pellets is preferably not less than 80 mass %, more preferably not less than 90 mass %, and particularly preferably 100 mass % of the raw pellets.

In the production of the raw pellets, additives such as, for example, tackifier resins, plasticizers and softeners described later may be added as required to the acrylic block copolymer (A) as long as the characteristics of the acrylic block copolymer (A) are not impaired, and the mixture may be formed into raw pellets.

<Aqueous Dispersions (C)>

An aqueous dispersion (C) used in the present invention contains acrylic resin particles (B) and no surfactants.

The acrylic resin forming the acrylic resin particles (B) is a polymer principally including (meth)acrylic acid ester units, and preferably contains methyl methacrylate units at not less than 85 mass %, more preferably not less than 88 mass %, and still more preferably not less than 90 mass %. The content of methyl methacrylate units may be 100 mass %.

When the acrylic resin particles (B) contained in the aqueous dispersion (C) have a content of methyl methacrylate units in the above range, the compatibility thereof with the raw pellets of the acrylic block copolymer (A) is enhanced, with the result that excellent transparency tends to be obtained.

The acrylic resin may include monomer units other than the methyl methacrylate units.

Examples of the monomers which may form such additional monomer units include methacrylic acid alkyl esters (except methyl methacrylate) such as ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate and isobornyl methacrylate; acrylic acid alkyl esters such as methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate and stearyl acrylate; (meth)acrylic acid esters except (meth)acrylic acid alkyl esters, such as methoxyethyl (meth)acrylate, ethoxyethyl (meth)acrylate, diethylaminoethyl (meth)acrylate, glycidyl (meth)acrylate and tetrahydrofurfuryl (meth)acrylate; aromatic vinyl compounds such as styrene, α-methylstyrene and p-methylstyrene; conjugated diene compounds such as butadiene and isoprene; olefin compounds such as ethylene and propylene; acrylic acid; and methacrylic acid.

Of these additional monomers, methacrylic acid alkyl esters (except methyl methacrylate), acrylic acid alkyl esters and methacrylic acid are preferable.

The content of the additional monomer units is preferably not more than 15 mass %, more preferably not more than 12 mass %, and still more preferably not more than 10 mass %. The content of the additional monomer units may be 0 mass %.

When the acrylic resin is a methyl methacrylate copolymer, the form of the copolymer is not particularly limited and may be, for example, random copolymer, block copolymer, graft copolymer, alternate copolymer or the like. In particular, a methyl methacrylate random copolymer is preferable, and a methyl methacrylate-methyl acrylate random copolymer is more preferable from the points of view of higher antiblocking properties and availability.

The stereoregularity of the acrylic resin is not particularly limited and may be isotactic, heterotactic or syndiotactic.

The weight average molecular weight of the acrylic resin is preferably 50,000 to 100,000. When the weight average molecular weight is in the above range, the resin exhibits good compatibility with the acrylic block copolymer (A), and high transparency is obtained when the pellets are formed into shaped articles or solvent adhesives. From the point of view of the balance between the compatibility with the acrylic block copolymer (A) and antiblocking properties, the weight average molecular weight is more preferably 60,000 to 95,000, and still more preferably 70,000 to 90,000.

The acrylic resin may be produced by any method without limitation, for example, by solution polymerization, emulsion polymerization, bulk polymerization or the like. Further, the acrylic resin may be a mixture of two or more kinds of polymers having different compositions or a mixture of polymers obtained by different production methods. The initiator used at the polymerization is preferably a radical polymerization initiator. Examples of the radical polymerization initiators include azo compounds such as azobisisobutyronitrile (AIBN) and azobis-γ-dimethylvaleronitrile; and peroxides such as benzoyl peroxide, cumyl peroxide, peroxyneodecanoate, diisopropyl peroxydicarbonate, t-butyl cumyl peroxide, cumenehydroperoxide, t-butyl hydroperoxide, cyclohexanone peroxide, methyl ethyl ketone peroxide, dicumyl peroxide and lauroyl peroxide. The radical polymerization initiator is usually used in an amount of 0.05 to 0.5 parts by mass with respect to 100 parts by mass of all the monomers used in the production of the acrylic resin. The polymerization is usually performed at a temperature of 50 to 140° C. for 2 to 20 hours. A chain transfer agent may be used to control the molecular weight of the acrylic resin. Examples of the chain transfer agents include methyl mercaptan, ethyl mercaptan, isopropyl mercaptan, n-butyl mercaptan, t-butyl mercaptan, n-hexyl mercaptan, n-octyl mercaptan, n-dodecyl mercaptan, ethyl thioglycolate, mercaptoethanol, thio-β-naphthol and thiophenol. The chain transfer agent is usually used in the range of 0.005 to 0.5 mass % relative to all the monomers used in the production of the acrylic resin.

The acrylic resin particles (B) are preferably produced by preparing an acrylic resin as described hereinabove and grinding the resin. The grinding may be dry grinding or wet grinding.

In a preferred embodiment, the aqueous dispersion (C) includes at least one selected from the group consisting of an aqueous dispersion (C-1) containing wet-ground acrylic resin particles (B), and an aqueous dispersion (C-2) containing dry-ground acrylic resin particles (B). In particular, an aqueous dispersion (C-1) containing wet-ground acrylic resin particles (B) tends to offer sufficient antiblocking properties of pellets and to generate less froths, and is also advantageous in that dispersibility in water tends to be more excellent.

Dry grinding is a technique suited for pulverizing a produced mass of resin into moderately large resin particles (for example, 1 to 100 μm). Wet grinding is a technique suited for producing smaller resin particles (for example, 1 μm to 50 μm). Dry grinding and wet grinding may be performed in combination. Further, the resin particles may be classified using a sieve or the like so as to attain the desired particle size or particle size distribution.

The D50 value in the particle size distribution of the acrylic resin particles (B) is preferably 1 to 50 μm, more preferably 1 to 25 μm, and still more preferably 1 to 15 μm. When the D50 value is in the above range, the acrylic resin particles (B) tend to attach favorably to the raw pellets of the acrylic block copolymer (A), thus imparting excellent antiblocking properties. Further, the stability of the aqueous dispersion (C) is enhanced. If the value is smaller than 1 μm, the particles will attach excellently but will be difficult to produce by wet grinding and dry grinding with high productivity. If the value is larger than 50 μm, the particles tend to be precipitated significantly and are sometimes difficult to produce in the form of the aqueous dispersion (C). The D50 value in the particle size distribution of the acrylic resin particles (B) contained in the aqueous dispersion (C) is the particle size at 50% cumulative particle volume relative to the total particle volume in the particle size distribution obtained using a laser diffraction particle size distribution analyzer.

The D10 value in the particle size distribution of the acrylic resin particles (B) is preferably 1 to 70 μm, more preferably 1 to 50 μm, still more preferably 1 to 30 μm, and further preferably 1 to 15 μm, and may be 1 to 10 μm. When the D10 value is in the above range, the acrylic resin particles (B) tend to attach favorably to the raw pellets of the acrylic block copolymer (A), thus imparting excellent antiblocking properties. Further, the stability of the aqueous dispersion (C) is enhanced. The D10 value in the particle size distribution of the acrylic resin particles (B) contained in the aqueous dispersion (C) is the particle size at 10% cumulative particle volume relative to the total particle volume in the particle size distribution obtained using a laser diffraction particle size distribution analyzer.

The D90 value in the particle size distribution of the acrylic resin particles (B) is preferably 1 to 100 μm, more preferably 1 to 70 μm, still more preferably 1 to 50 μm, and further preferably 1 to 35 μm, and may be 1 to 20 μm. When the D90 value is in the above range, the acrylic resin particles (B) tend to attach favorably to the raw pellets of the acrylic block copolymer (A), thus imparting excellent antiblocking properties. Further, the stability of the aqueous dispersion (C) is enhanced. The D90 value in the particle size distribution of the acrylic resin particles (B) contained in the aqueous dispersion (C) is the particle size at 90% cumulative particle volume relative to the total particle volume in the particle size distribution obtained using a laser diffraction particle size distribution analyzer.

The solid concentration of the acrylic resin particles (B) in the aqueous dispersion (C) may be selected appropriately in consideration of factors such as handleability and stability, but is preferably 0.05 to 2.0 mass %, more preferably 0.1 to 1.0 mass %, and still more preferably 0.3 to 0.8 mass %.

The aqueous dispersion (C) contains no surfactants. If the aqueous dispersion (C) contains a surfactant, the stability of the acrylic resin particles (B) in the aqueous dispersion (C) is enhanced. However, the presence of a surfactant tends to deteriorate the adhesion of the acrylic resin particles (B) to the raw pellets of the acrylic block copolymer (A). Further, froths are generated during steps, and consequently the production efficiency tends to be lowered. If the aqueous dispersion (C) contains a surfactant, further, the surfactant will remain on the pellets obtained that include the acrylic block copolymer (A) even after the pellets are cleaned of water, thereby sometimes adversely affecting the inherent characteristics (for example, transparency) of the acrylic block copolymer (A). Therefore, the absence of any surfactants in the aqueous dispersion (C) is critical.

To reduce the probability of adverse effects on the inherent characteristics of the acrylic block copolymer (A), it is desirable that the aqueous dispersion (C) be free from protective colloid components such as water-soluble cellulose derivatives, and water-soluble thickeners formed of water-soluble polymers.

The aqueous dispersion (C) may be produced by any method without limitation. For example, it may be prepared as described below.

In a specific production method, an aqueous dispersion (C-1) may be produced by grinding an acrylic resin into a predetermined particle size distribution by a bead mill wet grinding method using water as a solvent, thereby recovering the particles as an aqueous dispersion, and diluting the aqueous dispersion thus obtained. If the solid concentration in the aqueous dispersion is too high during the wet grinding operation, the viscosity is so increased that the operation is hindered. Thus, the solid concentration is appropriately 30 mass % or less. Further, the acrylic resin subjected to wet grinding is preferably primarily pulverized beforehand by a dry grinding method such as an ACM pulverizer or a counter jet mill. More preferably, the acrylic resin subjected to dry grinding has a bead shape of about 300 μm size. Further, an aqueous dispersion (C-2) may be produced by grinding an acrylic resin into a predetermined particle size distribution by a dry grinding method such as an ACM pulverizer or a counter jet mill, and dispersing the ground acrylic resin particles (B) into water.

A method of the present invention for producing pellets (D) including the acrylic block copolymer (A) includes a step of bringing the raw pellets of the acrylic block copolymer (A) into contact with the aqueous dispersion (C) containing the acrylic resin particles (B) and no surfactants.

The raw pellets of the acrylic block copolymer (A) may be brought into contact with the aqueous dispersion (C) in any manner without limitation. For example, the aqueous dispersion (C) may be sprayed to the raw pellets of the acrylic block copolymer (A), or the raw pellets of the acrylic block copolymer (A) may be added to the aqueous dispersion (C).

For example, the aqueous dispersion (C) may be sprayed in such a manner that the raw pellets are arranged on a transfer device such as a conveyor and are passed through a sprayer while continuously spraying the aqueous dispersion (C) thereto.

For example, the raw pellets of the acrylic block copolymer (A) may be added to the aqueous dispersion (C) in such a manner that the aqueous dispersion (C) and the raw pellets are charged into a mixing tank equipped with a stirrer and are mixed together at a temperature ranging from 0° C. to the boiling point of the solvent contained in the aqueous dispersion (C) for a predetermined amount of time, and the pellets and the aqueous dispersion (C) are separated from each other by filtration or the like.

In the above step, from the point of view of adhesion, the raw pellets of the acrylic block copolymer (A) are preferably brought into contact with the aqueous dispersion (C) having a temperature of 10 to 80° C., more preferably 30 to 60° C.

Of the manners described above, the contact is preferably made by adding the raw pellets of the acrylic block copolymer (A) into the aqueous dispersion (C) for reasons such as because the pellets can be rendered antiblocking stably.

The raw pellets resulting from the step of contact with the aqueous dispersion (C) bear the aqueous dispersion (C) on the surface thereof. The production method of the present invention includes, after the contact step, a step of removing water of the aqueous dispersion (C) attached to the surface of the pellets. The water removal may be performed in any manner without limitation. For example, water of the aqueous dispersion (C) attached to the pellet surface may be removed by air blowing or blowing hot air as required. Through the steps described above, pellets (D) including the acrylic block copolymer (A) may be obtained in which the acrylic resin particles (B) attach to the surface of the raw pellets of the acrylic block copolymer (A).

In, for example, a downstream manufacturing system in which the pellets (D) including the acrylic block copolymer (A) of the present invention are formed into a final product and packaged, there will be no or little residual pellets stemming from the blocking tendency of the raw pellets. In the case where the pellets are the final product, the method may further include a step of contacting an additional amount of acrylic resin particles (B) with the pellets (D) to ensure that the pellets will exhibit higher antiblocking effects during relatively long storage of the pellets before use (for example, melt forming or the preparation of adhesive). The acrylic resin particles (B) may be brought into contact with the pellets (D) including the acrylic block copolymer (A) in any manner without limitation. For example, the pellets (D) including the acrylic block copolymer (A), and dry-ground acrylic resin particles (B) may be mixed with each other directly. Examples of the direct mixing devices include horizontal cylindrical mixers, twin-cylinder mixers, double conical mixers, ribbon mixers, conical screw mixers, high-speed flow type mixers, rotary disk type mixers, air flow stirring mixers, gravitational dropping mixers and stirring mixers. This additional step affords pellets (D') including the acrylic block copolymer (A) which attain further enhanced antiblocking effects.

The pellets (D) and pellets (D') including the acrylic block copolymer (A) which are obtained as described above may be formed into desired shapes by numerous shaping methods commonly used for thermoplastic resins, such as injection molding, extrusion and calendering. Further, the pellets may be used as an elastomer material, a modifier for resins, rubbers, asphalts, etc., a vibration damping agent, a base polymer for adhesives, and a component for resin modifiers.

EXAMPLES

The present invention will be described in detail based on Examples hereinbelow. However, it should be construed that the scope of the present invention is not limited thereto. In Examples and Comparative Examples, properties were measured or evaluated by the following methods.

(Weight Average Molecular Weight (Mw), Number Average Molecular Weight (Mn), and Molecular Weight Distribution (Mw/Mn))

The weight average molecular weight, number average molecular weight and molecular weight distribution of acrylic block copolymers were determined as polystyrene-equivalent molecular weights by gel permeation chromatography (hereinafter, abbreviated as GPC). The details are as follows.

Device: GPC device "HLC-8020" manufactured by TOSOH CORPORATION
Separation columns: "TSKgel GMHXL", "G4000HXL" and "G5000HXL" manufactured by TOSOH CORPORATION were connected in series.
Eluent: Tetrahydrofuran
Eluent flow rate: 1.0 ml/min
Column temperature: 40° C.
Detection method: Differential refractive index (RI)

(Proportions of Polymer Blocks)

The proportions of polymer blocks in an acrylic block copolymer were determined by $^1$H-NMR ($^1$H-nuclear magnetic resonance) measurement. The details are as follows.

Device: Nuclear magnetic resonance apparatus "JNM-LA400" manufactured by JEOL Ltd.
Deuterated solvent: Deuterated chloroform (Particle Size Distribution (D10 Value, D50 Value and D90 Value) of Acrylic Resin Particles in Aqueous Dispersion)

The particle size distribution (D10 value, D50 value and D90 value) of acrylic resin particles in an aqueous dispersion was determined using a laser diffraction particle size distribution analyzer. The details are as follows.

Device: Laser diffraction scattering type particle size distribution analyzer "MICROTRACK MT3000II" manufactured by MicrotracBEL Corp.
Measurement solvent: Water In Comparative Examples 1 and 2, the average particle sizes disclosed by the manufacturers are described. In Comparative Examples 3 and 4, the values according to Example 1 (ALFLOWH50ES) and Example 4 (ALFLOWH50T) of JP-A-2016-188327 are described.

(Dispersibility in Water)

An aqueous dispersion or emulsion prepared in Example or Comparative Example was placed into a 100 ml screw tube. The screw tube was shaken vigorously up and down continuously for 15 seconds and was allowed to stand at room temperature for 0.5 hours. The liquid was then visually inspected for any sediment or floating matter.

AA: There were no sediment and no floating matter.
A: There was minor sediment and/or floating matter.
B: There was much sediment and/or floating matter forming a completely separate phase.

(Pellet Blocking Evaluation 1)

1. Fifteen (15) g of raw pellets of an acrylic block copolymer and 40 g of an aqueous dispersion or emulsion prepared in Example or Comparative Example were heated to 60° C. in advance and were added to a polyethylene sample bag (240 mm in length×170 mm in width×0.08 mm in thickness). The raw pellets were soaked with the aqueous dispersion for 15 seconds while gently shaking the bag up and down.
2. After soaking, the pellets and the aqueous dispersion were separated from each other using a drainer net.
3. Air was blown to the pellets remaining on the drainer net from above the drainer net using an air gun to remove water attached to the pellet surface.
4. The pellets that had been dried were put on the palm of a hand and were squeezed for 5 seconds. The pellets were then evaluated whether they became loose or remained as lumps.

AA: The pellets were completely loose.
A: Some of the pellets formed lumps.
B: The pellets formed one lump.

(Pellet Blocking Evaluation 2)

Acrylic resin particles or a commercially available anti-blocking agent was added in a mass ratio of 1000 ppm to 30 g of raw pellets of an acrylic block copolymer. The mixture was transferred to a 100 ml plastic beaker, and a weight was placed to apply a load per unit area of 103 g/cm². The mixture was allowed to stand in a dryer at 40° C. for 1 week. The blocking state of the pellets was visually evaluated while taking out the pellets from the plastic beaker.

AA: The pellets were completely loose.
A: Some of the pellets formed lumps but were easily disassembled when touched with a finger.
B: Some of the pellets formed lumps and were not easily disassembled even when touched with a finger.

(Frothing of Aqueous Dispersion or Emulsion)

An aqueous dispersion or emulsion prepared in Example or Comparative Example was placed into a 100 ml screw tube and was heated at 62° C. for 1 hour. After the temperature of the aqueous dispersion or emulsion had been confirmed to be 60° C., the screw tube was shaken vigorously up and down continuously for 15 seconds and was allowed to stand at room temperature for 30 seconds. Immediately thereafter, the size of residual froths (the height from the interface between the froths and the aqueous dispersion or emulsion, to the top of the froths) was evaluated.

AA: The froth size was 0 mm to less than 1 mm.
A: The froth size was 1 mm to less than 5 mm.
B: The froth size was 5 mm or more.

(Transparency)

Acrylic resin particles or a commercially available anti-blocking agent was added in a mass ratio of 0.1 phr to raw pellets of an acrylic block copolymer. The mixture was kneaded in a twin-screw extruder ("ZSK-25" manufactured by KRUPP WERNER & PFLEIDERER) and was pelletized with a strand cutter. The pellets were molded into a 50 mm×50 mm article having a thickness of 3 mm using an injection molding machine ("SE18DU" manufactured by Sumitomo Heavy Industries, Ltd.) at a cylinder temperature and a mold temperature described below. The molded article was analyzed on a direct-reading haze meter ("NDH5000" manufactured by NIPPON DENSHOKU INDUSTRIES CO., LTD.) in accordance with ISO 13468-1 to determine the haze (HAZE) and the total light transmittance (TT) as indexes of transparency.

Cylinder temperature: 210° C.
Mold temperature: 50° C.

[Production Example 1] [Acrylic Block Copolymer (A1)]

(1) The inside of a 100 L polymerization vessel was purged with nitrogen, and 46.5 kg of toluene and 1.08 kg of 1,2-dimethoxyethane were added at room temperature while performing stirring. Subsequently, 1.60 kg of a toluene solution containing 808.5 mmol of isobutylbis(2,6-di-t-butyl-4-methylphenoxy)aluminum was added, and further 0.06 kg of a sec-butyllithium in cyclohexane solution containing 103.95 mmol of sec-butyllithium was added.

(2) Subsequently, 1.08 kg of methyl methacrylate was added. The reaction solution was yellow at first and became colorless after being stirred at room temperature for 60 minutes.
(3) Subsequently, the internal temperature of the polymerization solution was cooled to −30° C., and 13.53 kg of n-butyl acrylate was added dropwise over a period of 2 hours. After the completion of the dropwise addition, the mixture was stirred at −30° C. for 5 minutes.
(4) Further, 1.49 kg of methyl methacrylate was added, and the mixture was stirred at room temperature overnight.
(5) The polymerization reaction was terminated by the addition of 0.50 kg of methanol. Thereafter, the reaction solution obtained was poured into 495 kg of methanol to precipitate a liquid deposit. Thereafter, the liquid deposit was recovered and dried. Thus, 14.8 kg of an acrylic triblock copolymer (A1) was obtained which had a content of methyl methacrylate units (a content of polymer blocks (a2)) of 16.3 mass %, a weight average molecular weight of 159,000, and a molecular weight distribution (weight average molecular weight/number average molecular weight) of 1.10.
(6) The above procedures of Production Example 1 were repeated 10 times. Approximately 150 kg of the acrylic triblock copolymer (A1) was thus obtained.
(7) The acrylic triblock copolymer (A1) obtained was kneaded in a twin-screw extruder ("ZSK-25" manufactured by KRUPP WERNER & PFLEIDERER) and was pelletized with a strand cutter.

[Production Example 2] [Acrylic Block Copolymer (A2)]

(1) The inside of a 100 L polymerization vessel was purged with nitrogen, and 43.4 kg of toluene and 2.17 kg of 1,2-dimethoxyethane were added at room temperature while performing stirring. Subsequently, 4.0 kg of a toluene solution containing 2008.0 mmol of isobutylbis(2,6-di-t-butyl-4-methylphenoxy)aluminum was added, and further 0.14 kg of a sec-butyllithium in cyclohexane solution containing 249.8 mmol of sec-butyllithium was added.
(2) Subsequently, 2.31 kg of methyl methacrylate was added. The reaction solution was yellow at first and became colorless after being stirred at room temperature for 60 minutes.
(3) Subsequently, the internal temperature of the polymerization solution was cooled to −30° C., and 10.49 kg of n-butyl acrylate was added dropwise over a period of 2 hours. After the completion of the dropwise addition, the mixture was stirred at −30° C. for 5 minutes.
(4) Further, 2.19 kg of methyl methacrylate was added, and the mixture was stirred at room temperature overnight.
(5) The polymerization reaction was terminated by the addition of 0.67 kg of methanol. The reaction solution obtained was poured into 500 kg of methanol to precipitate a liquid deposit. Thereafter, the liquid deposit was recovered and dried. Thus, 14.7 kg of an acrylic triblock copolymer (A2) was obtained which had a content of methyl methacrylate units (a content of polymer blocks (a2)) of 30.3 mass %, a weight average molecular weight of 61,000, and a molecular weight distribution of 1.09.
(6) The above procedures of Production Example 2 were repeated 10 times. Approximately 150 kg of the acrylic triblock copolymer (A2) was thus obtained.
(7) The acrylic triblock copolymer (A2) obtained was kneaded in a twin-screw extruder ("ZSK-25" manufactured by KRUPP WERNER & PFLEIDERER) and was pelletized with a strand cutter.

[Production Example 3] [Acrylic Block Copolymer (A3)]

(1) A three-way cock was attached to a 3 L three-necked flask, and the inside was purged with nitrogen. Thereafter, while performing stirring at room temperature, the flask was charged with 1409 g of toluene and 32.7 g of 1,2-dimethoxyethane, subsequently charged with 48.6 g of a toluene solution containing 24.5 mmol of isobutylbis(2,6-di-t-butyl-4-methylphenoxy)aluminum, and further charged with 2.55 g of a sec-butyllithium in cyclohexane solution containing 4.35 mmol of sec-butyllithium.
(2) Subsequently, 43.5 g of methyl methacrylate was added. The reaction solution was yellow at first and became colorless after being stirred at room temperature for 60 minutes.
(3) Subsequently, the internal temperature of the polymerization solution was cooled to −30° C., and 360 g of n-butyl acrylate was added dropwise over a period of 2 hours. After the completion of the dropwise addition, the mixture was stirred at −30° C. for 5 minutes.
(4) Further, 61.5 g of methyl methacrylate was added, and the mixture was stirred at room temperature overnight.
(5) The polymerization reaction was terminated by the addition of 15 g of methanol. The reaction solution obtained was poured into 15 kg of methanol to precipitate a liquid deposit. Thereafter, the liquid deposit was recovered and dried. Thus, 450 g of an acrylic triblock copolymer (A3) was obtained which had a content of methyl methacrylate units (a content of polymer blocks (a2)) of 22.5 mass %, a weight average molecular weight of 111,000, and a molecular weight distribution of 1.09.
(6) The acrylic triblock copolymer (A3) obtained was kneaded in a compact twin-screw extruder ("KZW-15" manufactured by TECHNOVEL CORPORATION) and was pelletized with a strand cutter.

[Production Example 4] [Acrylic Block Copolymer (A4)]

(1) A three-way cock was attached to a 3 L three-necked flask, and the inside was purged with nitrogen. Thereafter, while performing stirring at room temperature, the flask was charged with 1409 g of toluene and 32.7 g of 1,2-dimethoxyethane, subsequently charged with 48.6 g of a toluene solution containing 24.5 mmol of isobutylbis(2,6-di-t-butyl-4-methylphenoxy)aluminum, and further charged with 1.50 g of a sec-butyllithium in cyclohexane solution containing 2.55 mmol of sec-butyllithium.
(2) Subsequently, 22.7 g of methyl methacrylate was added. The reaction solution was yellow at first and became colorless after being stirred at room temperature for 60 minutes.
(3) Subsequently, the internal temperature of the polymerization solution was cooled to −30° C., and 434 g of n-butyl acrylate was added dropwise over a period of 2 hours. After the completion of the dropwise addition, the mixture was stirred at −30° C. for 5 minutes.

(4) Further, 29.4 g of methyl methacrylate was added, and the mixture was stirred at room temperature overnight.

(5) The polymerization reaction was terminated by the addition of 15 g of methanol. The reaction solution obtained was poured into 15 kg of methanol to precipitate a liquid deposit. Thereafter, the liquid deposit was recovered and dried. Thus, 440 g of an acrylic triblock copolymer (A4) was obtained which had a content of methyl methacrylate units (a content of polymer blocks (a2)) of 11.0 mass %, a weight average molecular weight of 200,000, and a molecular weight distribution of 1.11.

(6) The acrylic triblock copolymer (A4) obtained was kneaded in a compact twin-screw extruder ("KZW-15" manufactured by TECHNOVEL CORPORATION) and was pelletized with a strand cutter.

[Production Example 5] [Acrylic Block Copolymer (A5)]

(1) A three-way cock was attached to a 5 L three-necked flask, and the inside was purged with nitrogen. Thereafter, while performing stirring at room temperature, the flask was charged with 1542 g of toluene and 100 g of 1,2-dimethoxyethane, subsequently charged with 183 g of a toluene solution containing 92.0 mmol of isobutylbis(2,6-di-t-butyl-4-methylphenoxy)aluminum, and further charged with 1.70 g of a sec-butyllithium in cyclohexane solution containing 11.5 mmol of sec-butyllithium.

(2) Subsequently, 74.9 g of methyl methacrylate was added. The reaction solution was yellow at first and became colorless after being stirred at room temperature for 60 minutes.

(3) Subsequently, the internal temperature of the polymerization solution was cooled to −30° C., and 253 g of n-butyl acrylate was added dropwise over a period of 2 hours. After the completion of the dropwise addition, the mixture was stirred at −30° C. for 5 minutes.

(4) Further, 184.4 g of methyl methacrylate was added, and the mixture was stirred at room temperature overnight.

(5) The polymerization reaction was terminated by the addition of 45 g of methanol. The reaction solution obtained was poured into 15 kg of methanol to precipitate a liquid deposit. Thereafter, the liquid deposit was recovered and dried. Thus, 450 g of an acrylic triblock copolymer (A5) was obtained which had a content of methyl methacrylate units (a content of polymer blocks (a2)) of 50.0 mass %, a weight average molecular weight of 62,000, and a molecular weight distribution of 1.12.

(6) The above procedures of Production Example 5 were repeated 5 times. Approximately 2.3 kg of the acrylic triblock copolymer (A2) was thus obtained.

(7) The acrylic triblock copolymer (A5) obtained was kneaded in a twin-screw extruder ("ZSK-25" manufactured by KRUPP WERNER & PFLEIDERER) and was pelletized with a strand cutter.

Table 1 describes the block structures, the weight average molecular weights (Mw), the molecular weight distributions (Mw/Mn), and the contents of the polymer blocks (a2) in the acrylic block copolymers (A1) to (A5) obtained in Production Examples 1 to 5.

TABLE 1

|  | Prod. Ex. 1 | Prod. Ex. 2 | Prod. Ex. 3 | Prod. Ex. 4 | Prod. Ex. 5 |
|---|---|---|---|---|---|
| Acrylic block copolymer | (A1) | (A2) | (A3) | (A4) | (A5) |
| Block structure | a2-a1-a2 | a2-a1-a2 | a2-a1-a2 | a2-a1-a2 | a2-a1-a2 |
| Mw of acrylic block copolymer | 159,000 | 61,000 | 111,000 | 200,000 | 62,000 |
| Mw/Mn of acrylic block copolymer | 1.10 | 1.09 | 1.09 | 1.11 | 1.12 |
| Content (mass %) of polymer blocks (a2) | 16.3 | 30.3 | 22.5 | 11.0 | 50.0 |

Example 1

An acrylic resin (content of methyl methacrylate units: 90 mass %, weight average molecular weight: 85,000) was ground with dry grinders described later to give acrylic resin particles (B1) having a D50 value in the ground particle size distribution of 6 μm. The acrylic resin particles (B1) obtained were dispersed in water so that the solid concentration would be 0.5 mass %, thus forming an aqueous dispersion (C-2-1). Properties were evaluated. Because the particles had been produced by dry grinding alone, the particles showed a slight tendency to deposit and were evaluated as "A" in dispersibility in water. In the pellet blocking evaluation 1, good antiblocking properties "AA" were imparted to the pellets of the acrylic block copolymers (A1 to A4). Further, the aqueous dispersion (C-2-1) did not form froths and was evaluated as "AA". The results are described in Table 2.

Dry grinders: Impact grinder ("ACM Pulverizer-10" manufactured by HOSOKAWA MICRON CORPORATION), counter jet mill ("200AFG" manufactured by HOSOKAWA MICRON CORPORATION)

Example 2

An acrylic resin (content of methyl methacrylate units: 90 mass %, weight average molecular weight: 85,000) was ground with a dry grinder described later to give acrylic resin particles (B2) having a D50 value in the ground particle size distribution of 27 μm. Thereafter, the particles were dispersed in water so that the solid concentration would be 0.5 mass % similarly to Example 1, thus forming an aqueous dispersion (C-2-2). Properties were evaluated. Due to the particle size distribution (D10 value, D50 value, D90 value) being slightly large, the particles showed a tendency to deposit and were evaluated as "A" in dispersibility in water. In the pellet blocking evaluation 1, the results were "A" for the pellets of the acrylic block copolymers (A1, A3 and A4) which were prone to adhere to one another. Further, the aqueous dispersion (C-2-2) did not form froths and was evaluated as "AA". The results are described in Table 2.

Dry grinder: Impact grinder ("ACM Pulverizer-10" manufactured by HOSOKAWA MICRON CORPORATION)

Example 3

The acrylic resin particles (B2) produced in Example 2 were used as a raw material and were ground with a wet grinder described later in water as a medium to give an aqueous dispersion of acrylic resin particles (B3) having a D50 value in the ground particle size distribution of 6 μm. Thereafter, the solid concentration was adjusted to 0.5 mass %. An aqueous dispersion (C-1-1) was thus prepared. Properties were evaluated. The dispersibility in water was "AA". In the pellet blocking evaluation 1, good antiblocking properties "AA" were imparted to the pellets of the acrylic block copolymers (A1 to A4). Further, the aqueous dispersion (C-1-1) did not form froths and was evaluated as "AA". The results are described in Table 2.

Wet grinder: Star Mill ("LMZ" manufactured by Ashizawa Finetech Ltd.)

Example 4

The aqueous dispersion of the acrylic resin particles (B3) produced in Example 3 was adjusted to a solid concentration of 0.2 mass %, thus forming an aqueous dispersion (C-1-2). Properties were evaluated. The dispersibility in water was "AA". In the pellet blocking evaluation 1, the results were "A" for the pellets of the acrylic block copolymers (A1, A3 and A4) which were prone to adhere to one another. The aqueous dispersion (C-1-2) did not form froths and was evaluated as "AA". The results are described in Table 2.

Example 5

An aqueous dispersion of acrylic resin particles (B4) was produced in the same manner as in Example 3 so that the D50 value after grinding would be 9 μm. Thereafter, the solid concentration was adjusted to 0.5 mass %, thereby forming an aqueous dispersion (C-1-3). Properties were evaluated. The dispersibility in water was "AA". In the pellet blocking evaluation 1, the result was "A" for the pellets of the acrylic block copolymer (A1) which were most prone to adhere to one another. The aqueous dispersion (C-1-3) did not form froths and was evaluated as "AA". The results are described in Table 2.

Example 6

An aqueous dispersion of acrylic resin particles (B5) was produced in the same manner as in Example 3 so that the D50 value after grinding would be 17 μm. Thereafter, the solid concentration was adjusted to 0.5 mass %, thereby forming an aqueous dispersion (C-1-4). Properties were evaluated. Due to the particle size distribution (D10 value, D50 value, D90 value) being slightly large, the particles showed a tendency to deposit and were evaluated as "A" in dispersibility in water. In the pellet blocking evaluation 1, the results were "A" for the pellets of the acrylic block copolymers (A1, A3 and A4) which were prone to adhere to one another. The aqueous dispersion (C-1-4) did not form froths and was evaluated as "AA". The results are described in Table 2.

Comparative Example 1

Aerosil R972 (manufactured by Nippon Aerosil Co., Ltd., hydrophobic silicon dioxide) was dispersed in water so that the solid concentration would be 0.5 mass %, thereby preparing an aqueous dispersion. Properties were evaluated. Aerosil R972 was hydrophobic and was therefore completely separate in water, with the dispersibility in water being rated as "B". In the pellet blocking evaluation 1, the solid could not be attached to the pellets due to the low dispersibility in water, and the results were "B" for the pellets of the acrylic block copolymers (A1 and A2). The aqueous dispersion did not form froths and was evaluated as "AA", although floating or suspended matter was seen. The results are described in Table 2.

Comparative Example 2

An aqueous dispersion was prepared in the same manner as in Comparative Example 1, except that Aerosil R972 was replaced by Aerosil 200V (manufactured by Nippon Aerosil Co., Ltd., hydrophilic silicon dioxide). Properties were evaluated. Aerosil 200V was hydrophilic and therefore showed good dispersibility in water, rated as "AA". In the pellet blocking evaluation 1, however, the results were "B" for the pellets of the acrylic block copolymers (A1 and A2). The aqueous dispersion did not form froths and was evaluated as "AA". The results are described in Table 2.

Comparative Example 3

An aqueous dispersion was prepared in the same manner as in Comparative Example 1, except that Aerosil R972 was replaced by ALFLOW H50T (manufactured by NOF CORPORATION, ethylenebisstearamide). Properties were evaluated. The particles were completely separate in water, with the dispersibility in water being rated as "B". In the pellet blocking evaluation 1, the solid could not be attached to the pellets due to the low dispersibility in water, and the results were "B" for the pellets of the acrylic block copolymers (A1 and A2). The aqueous dispersion did not form froths and was evaluated as "AA", although floating or suspended matter was seen. The results are described in Table 2.

Comparative Example 4

A dispersion was prepared in the same manner as in Comparative Example 1, except that Aerosil R972 was replaced by ALFLOW H50ES (manufactured by NOF CORPORATION, ethylenebisstearamide emulsion: 42 mass % nonvolatile components). Properties were evaluated. The dispersibility in water was good, rated as "AA". In the pellet blocking evaluation 1, good antiblocking properties "AA" were imparted to the pellets of the acrylic block copolymers (A1 and A2). The emulsion formed 5 mm or larger froths and was evaluated as "BB". The results are described in Table 2.

TABLE 2

|  |  | Ex. 1 | Ex. 2 | Ex. 3 | Ex. 4 | Ex. 5 | Ex. 6 |
|---|---|---|---|---|---|---|---|
| Acrylic resin particles (B) |  | (B1) | (B2) | (B3) | (B3) | (B4) | (B5) |
| Aqueous dispersion (C) |  | (C-2-1) | (C-2-2) | (C-1-1) | (C-1-2) | (C-1-3) | (C-1-4) |
| Particle size distribution | D10/D50/D90 (μm) | 4/6/9 | 10/27/47 | 2/6/18 | 2/6/18 | 3/9/26 | 5/17/45 |
| Solid concentration | (mass %) | 0.5 | 0.5 | 0.5 | 0.2 | 0.5 | 0.5 |
| Dispersibility in water |  | A | A | AA | AA | AA | A |
| Pellet blocking evaluation 1 | (A1) | AA | A | AA | A | A | A |
|  | (A2) | AA | AA | AA | AA | AA | AA |
|  | (A3) | AA | A | AA | A | AA | A |
|  | (A4) | AA | A | AA | A | AA | A |
| Frothing of aqueous dispersion |  | AA | AA | AA | AA | AA | AA |

|  |  | Comp. Ex. 1 | Comp. Ex. 2 | Comp. Ex. 3 | Comp. Ex. 4 |
|---|---|---|---|---|---|
| Antiblocking agent |  | Aerosil R972 | Aerosil 200V | ALFLOW H50T | ALFLOW H50ES |
| Aqueous dispersion (C) |  | Aqueous dispersion | Aqueous dispersion | Aqueous dispersion | Emulsion |
| Average particle size |  | About 16 nm | About 12 nm | 40 μm | 2 μm |
| Solid concentration | (mass %) | 0.5 | 0.5 | 0.5 | 0.5 |
| Dispersibility in water |  | B | AA | B | AA |
| Pellet blocking evaluation 1 | (A1) | B | B | B | AA |
|  | (A2) | B | B | B | AA |
| Frothing of aqueous dispersion or emulsion |  | AA | AA | AA | B |

Reference Example 1

Acrylic resin particles (B1) with a D50 value of 6 μm obtained by the method described in Example 1 were added in a mass ratio of 1000 ppm to the pellets of the acrylic block copolymer (A1 or A2). The pellet blocking evaluation 2 resulted in "AA" for the pellets of the acrylic block copolymers (A1 and A2). The results are described in Table 3.

Reference Example 2

The pellet blocking evaluation 2 was performed in the same manner as in Reference Example 1, except that the acrylic resin particles (B1) were replaced by acrylic resin particles (B2) with a D50 value of 27 μm obtained by the method described in Example 2. The results were "A" for the pellets of the acrylic block copolymers (A1 and A2). The results are described in Table 3.

Comparative Example 5

The pellet blocking evaluation 2 was performed in the same manner as in Reference Example 1, except that the acrylic resin particles (B1) were replaced by Aerosil R972. The results were "B" for the pellets of the acrylic block copolymer (A1). The results are described in Table 3.

Comparative Example 6

The pellet blocking evaluation 2 was performed in the same manner as in Reference Example 1, except that the acrylic resin particles (B1) were replaced by ALFLOW H50T. The results were "B" for the pellets of the acrylic block copolymers (A1 and A2). The results are described in Table 3.

TABLE 3

|  |  | Ref. Ex. 1 | Ref. Ex. 2 | Comp. Ex. 5 | Comp. Ex. 6 |
|---|---|---|---|---|---|
| Acrylic resin particles (B) |  | (B1) | (B2) | — | — |
| Antiblocking agent |  | — | — | Aerosil R972 | ALFLOW H50T |
| Particle size distribution | D10/D50/D90 (μm) | 4/6/9 | 10/27/47 | — | — |
| Average particle size |  | — | — | About 16 nm | 40 μm |
| Amount (ppm) |  | 1000 | 1000 | 1000 | 1000 |
| Pellet blocking evaluation 2 | (A1) | AA | A | B | B |
|  | (A2) | AA | A | A | B |

Example 7

The pellets of the acrylic block copolymer (A1) obtained in Production Example 1 and those of the acrylic block copolymer (A2) obtained in Production Example 2 were re-pelletized under extrusion conditions described later using an underwater cutting extruder and a centrifugal dehydrator described later. The aqueous dispersion (C-1-1) prepared in Example 3 was used as circulating cooling water. With this extrusion facility, spherical pellets having a diameter of about 3 mm were obtained. The process took place with good process flow efficiency, with no clogging stemming from the blocking of the pellets inside the die or the centrifugal dehydrator.

Extruder: JSW-JBa II, twin-screw, screw diameter 54 mm, L/D=42

Extrusion conditions: temperature 230° C., resin throughput 200 kg/h, screw rotational speed 520 rpm, die orifice diameter 2.4 mm×48 orifices, 4-blade cutter, circulating cooling water (PCW) 45° C., PCW flow rate 200 L/min Centrifugal dehydrator (manufactured by The Japan Steel Works, LTD.)

Example 8

The acrylic resin particles (B1) obtained in Example 1 were added on-line to the centrifugally dehydrated pellets from the process described in Example 7, in a ratio of about 1000 ppm relative to the mass of the pellets. The addition resulted in higher antiblocking properties and further enhanced the process flow efficiency.

Comparative Example 7

The pellets were re-pelletized in the same manner as in Example 7, except that the aqueous dispersion (C-1-1) prepared in Example 3 was replaced by the emulsion of Comparative Example 4. The PCW formed heavy froths, and the production efficiency was significantly lowered.

Example 9

Transparency was evaluated using acrylic resin particles (B1) with a D50 value of 6 μm obtained by the method described in Example 1. The transparency was good and was not lowered as compared with the transparency of the acrylic block copolymers (A2 and A5) without the addition of antiblocking agents. The results are described in Table 4.

Comparative Examples 8 and 9

Transparency was evaluated using particles described in Table 4. The transparency tended to be lower than that of the acrylic block copolymers (A2 and A5) without the addition of antiblocking agents, and the appearance had defects which looked like granular structures derived from the inorganic substances. The results are described in Table 4.

Comparative Example 10

Transparency was evaluated using particles described in Table 4. The transparency tended to be significantly lower than that of the acrylic block copolymers (A2 and A5) without the addition of antiblocking agents. The results are described in Table 4.

Reference Example 3

Transparency was evaluated using the acrylic block copolymers (A2 and A5) without the addition of antiblocking agents.

When the particle size distribution (D10 value, D50 value, D90 value) was large as was the case in Examples 2 and 6, the acrylic resin particles (B) imparted relatively low antiblocking properties to the acrylic block copolymer pellets which were prone to adhere to one another. In contrast, the antiblocking properties were enhanced when the particle size distribution (D10 value, D50 value, D90 value) was small as was the case in Examples 1, 3 and 4. Further, the acrylic resin particles (B) generally tended to show good dispersibility in water in spite of the absence of surfactants. Furthermore, as demonstrated in Example 9, the transparency was not lowered even when 0.1 phr of the acrylic resin particles (B) were added.

As demonstrated in Comparative Examples 1 and 2, Aerosils based on silicon dioxide were poor in antiblocking properties.

ALFLOW H50T used in Comparative Example 3 was not dispersible in water and was thus difficult to handle, deteriorating the production efficiency. Further, as demonstrated in Comparative Example 10, this antiblocking agent caused a decrease in transparency.

ALFLOW H50ES used in Comparative Example 4 was an emulsion and thus exhibited good dispersibility in water. Further, this agent offered good antiblocking properties. However, the emulsion formed heavy froths, and the production efficiency was deteriorated.

The invention claimed is:

1. A method for producing pellets (D) including an acrylic block copolymer (A), the method comprising:
   dry grinding and wet grinding an acrylic resin to produce acrylic resin particles (B);
   contacting raw pellets of an acrylic block copolymer (A) with an aqueous dispersion (C) comprising acrylic resin particles (B) and no surfactants, the acrylic block copolymer (A) comprising a polymer block (a1) comprising acrylic acid alkyl ester units and a polymer block (a2) comprising methacrylic acid alkyl ester units; and
   removing water attached to the pellets.

2. The method of claim 1, wherein the acrylic resin particles (B) in the aqueous dispersion (C) comprise not less than 85 mass % of methyl methacrylate units.

3. The method of claim 1, wherein the acrylic resin particles (B) in the aqueous dispersion (C) have a D50 value in a particle size distribution of from 1 to 50 μm.

4. The method of claim 1, wherein the solid concentration of the acrylic resin particles (B) in the aqueous dispersion (C) is in a range of from 0.05 to 2.0 mass %.

5. The method of claim 1, wherein, in the contacting, the raw pellets of the acrylic block copolymer (A) are brought into contact with the aqueous dispersion (C) having a temperature in a range of from 10 to 80° C.

TABLE 4

| | | Ex. 9 | Comp. Ex. 8 | Comp. Ex. 9 | Comp. Ex. 10 | Ref. Ex. 3 |
|---|---|---|---|---|---|---|
| Acrylic resin particles (B) | | (B1) | — | — | — | — |
| Antiblocking agent | | — | Aerosil R972 | Aerosil 200V | ALFLOW H50T | — |
| Particle size distribution | | D50 = 6 μm | — | — | — | — |
| Average particle size | | — | About 16 nm | About 12 nm | 40 μm | — |
| Amount (phr) | | 0.1 | 0.1 | 0.1 | 0.1 | 0 |
| (A2) | HAZE | 1.9 | 2.1 | 2.2 | 6.4 | 2 |
| | TT | 92.7 | 92.7 | 92.8 | 91.9 | 92.8 |
| (A5) | HAZE | 0.6 | 0.9 | 2.4 | 4.2 | 0.6 |
| | TT | 93 | 92.8 | 92.8 | 92.5 | 93 |

6. The method of claim 1, wherein the acrylic block copolymer (A) comprises, in the molecule thereof, a structure in which a polymer block (a2) comprising methacrylic acid alkyl ester units is bonded to each of both ends of a polymer block (a1) comprising acrylic acid alkyl ester units, and wherein the acrylic block copolymer (A) has a weight average molecular weight in a range of from 30,000 to 250,000 and a content of the polymer blocks (a2) in a range of from 5 to 40 mass %.

* * * * *